W. H. SHEAHAN.
DRY BATTERY.
APPLICATION FILED DEC. 13, 1918.

1,359,201.

Patented Nov. 16, 1920.

WITNESS:

INVENTOR
William H. Sheahan
BY
Frank S. Busser
ATTORNEY.

UNITED STATES PATENT OFFICE.

WILLIAM H. SHEAHAN, OF PHILADELPHIA, PENNSYLVANIA.

DRY BATTERY.

1,359,201. Specification of Letters Patent. Patented Nov. 16, 1920.

Application filed December 13, 1918. Serial No. 266,538.

*To all whom it may concern:*

Be it known that I, WILLIAM H. SHEAHAN, a citizen of the United States, residing at Philadelphia, county of Philadelphia, and State of Pennsylvania, have invented a new and useful Improvement in Dry Batteries, of which the following is a full, clear, and exact description, reference being had to the accompanying drawings, which form a part of this specification.

The ordinary commercial dry battery suffers substantial deterioration during non-use. Often a considerable period of time elapses between the date of its manufacture and the date when it actually reaches the hands of the ultimate user and is by him put into operation. The object of my invention is to provide a battery which will not be subject to deterioration during such period of non-use.

A preferred embodiment of the invention is shown in the accompanying drawings, in which—

Figure 2:
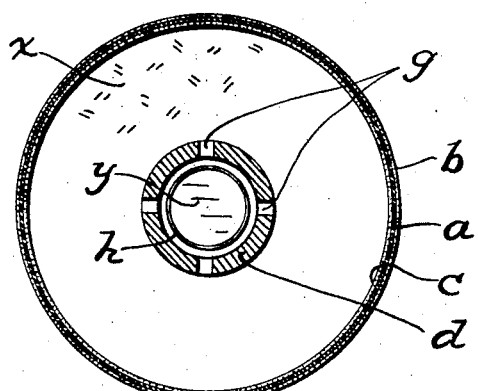
Figure 1:
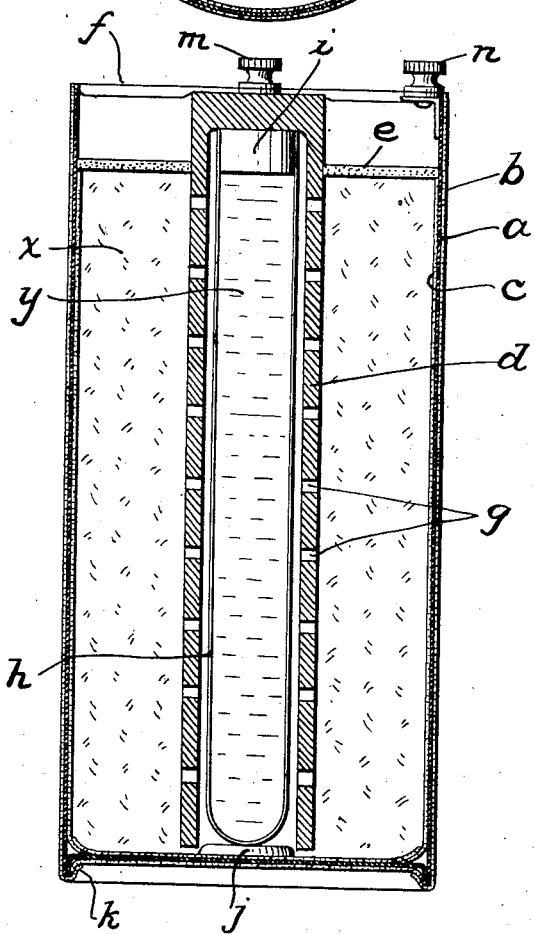

Figure 1 is a vertical sectional view of the battery and Fig. 2 a horizontal section.

The container $a$ is of zinc and constitutes the positive element or electrode. The container is inclosed by a pasteboard carton $b$ and incloses an inside container, or lining, $c$ of material, such as blotting paper, whose upper edge is some distance below the upper edges of the containers $a$ and $b$.

Centrally within the container $a$ is inserted the negative element or electrode $d$ of carbon. An annular head $e$ closes the top of the inner container. Between the head $e$ and the top $f$ of the battery is packed any suitable sealing material.

Within the annular space between the carbon element $d$ and the lining $c$ is packed the usual dry battery filler or depolarizer $x$ (without the electrolyte). This depolarizer may consist of manganese dioxid mixed with crushed charcoal and coke, graphite, calcium hydrate, arsenic acid and glucose mixed with starch. It is not, however, mixed with the liquid electrolyte, as is usual in dry battery construction, this element being maintained separate from the depolarizer by the following construction.

The carbon element, in the preferred construction, instead of being in the form of a solid bar, is made of cylindrical or tubular form, closed at its upper end, its circumferential wall being provided with any desired number of perforations $g$. This tube of carbon is secured to the top $f$ and is slightly shorter than the depth of the battery so that its lower end is separated from the bottom of the battery by a slight space.

Within the carbon tube is inserted a frangible vessel $h$, preferably of glass and closed at the top by a stopper $i$. This vessel rests on the bottom of the battery, which, however, is preferably provided with a raised support $j$ on which the container rests. The vessel holds the liquid electrolyte $y$, which may be a saturated solution of sodium and ammonium chlorid containing one tenth of its volume of mercury bichlorid solution and an equal amount of hydrochloric acid.

The zinc container $a$ should have a rim $k$ extending below its bottom so that the battery will rest on the rim and not directly on the bottom, thereby avoiding the danger of accidental breakage of the electrolite-containing vessel.

Just before putting the battery into use, a sharp blow is struck on the center of the bottom, thereby breaking the vessel $h$ and causing the electrolyte therein to flow through the perforations $g$ and permeate the depolarizing material, thereby putting the battery into condition to become active as soon as the terminals $m$ and $n$ are connected in circuit.

No measurable deterioration in the battery occurs during the period in which the liquid electrolyte is kept separate from the depolarizer and hence the battery, when put into use, possesses the strength of an ordinary dry battery fresh from the hands of the manufacturer.

Having now fully described my invention, what I claim and desire to protect by Letters Patent is—

1. A battery comprising a container adapted to receive a filler, a frangible vessel containing a liquid, said vessel being positioned centrally of and extending vertically within said container, and means whereby the liquid may be introduced into the filler substantially uniformly throughout the mass of the filler.

2. A battery comprising a container adapted to receive a filler, an electrode within the container, said electrode having a longitudinally extending cavity, and a frangible vessel, adapted to contain a liquid, positioned in said cavity.

3. A battery comprising a container forming one element of the battery, a hollow member with perforated walls forming another element of the battery, the annular space between the two elements adapted to contain a filler, and a frangible vessel, within the hollow element, adapted to contain a liquid electrolyte and to be ruptured by force applied to the bottom of the container.

4. A battery comprising a container adapted to receive a filler, an electrode within the container and extending into the filler, said electrode having a longitudinally extending cavity, and a frangible vessel for liquid electrolyte positioned in said cavity.

5. A battery comprising a container adapted to receive a filler and serving as one of the electrodes, a second electrode within the container, said electrode being hollow and provided with perforations affording communication between its hollow interior and said container, and a frangible vessel for liquid electrolyte within said second electrode.

6. A battery comprising a container adapted to receive a filler and serving as one of the electrodes, a second electrode within the container, said electrode being hollow, a raised support extending from the bottom of said container within said hollow electrode, and a frangible vessel for liquid electrolyte resting upon said support.

7. A battery comprising a container adapted to receive a filler and serving as one of the electrodes, a rim extending below the bottom of said container, said rim being adapted to support the battery and serve as a protection for the bottom, a second electrode, said electrode being hollow and perforated to afford communication with said container, and a frangible vessel for liquid electrolyte within said second electrode.

In testimony of which invention, I have hereunto set my hand, at Philada., Penna., of this 9th day of December, 1918.

WILLIAM H. SHEAHAN.